United States Patent Office 3,721,540
Patented Mar. 20, 1973

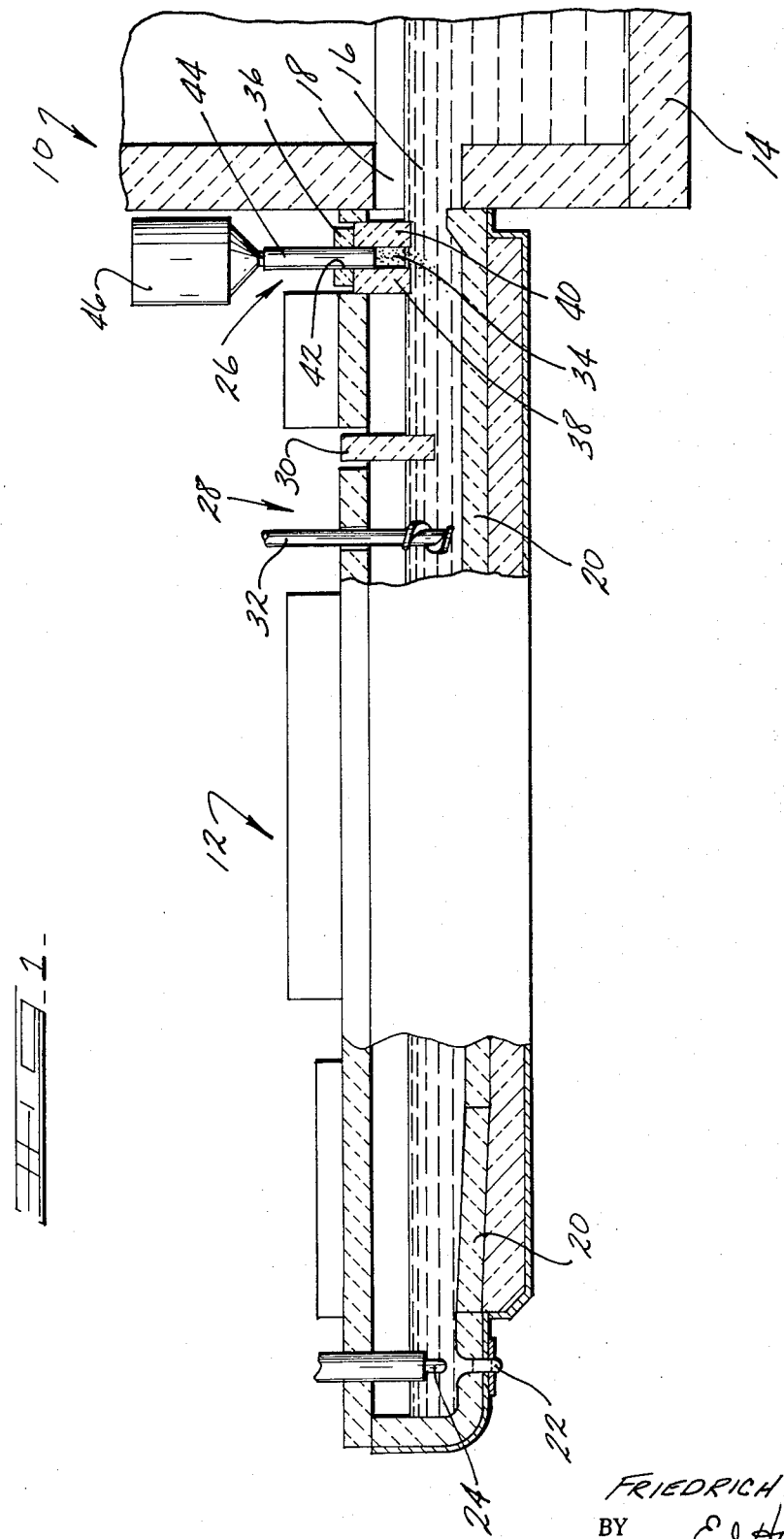

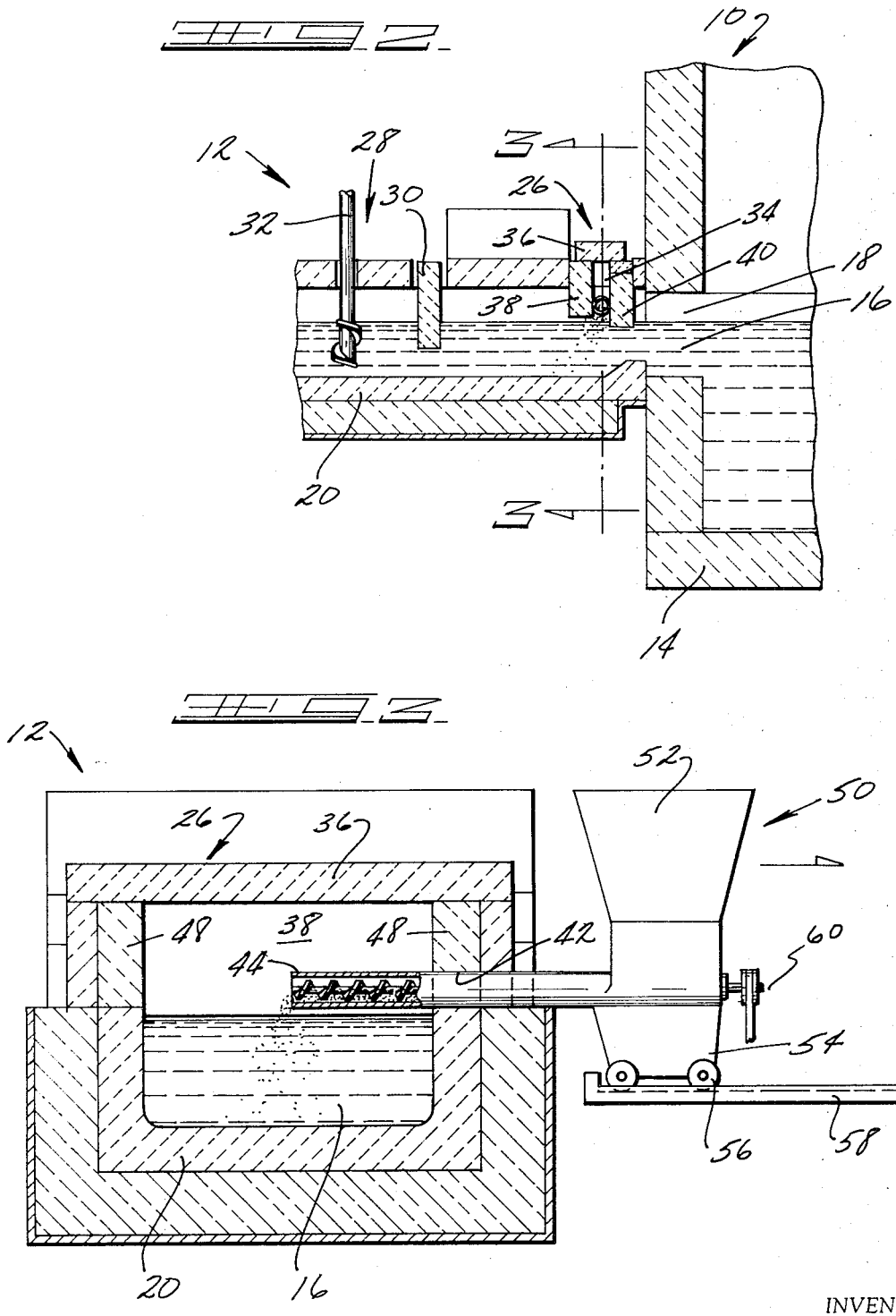

3,721,540
FOREHEARTH ADDITION SECTION
Friedrich W. Hammer, Toledo, Ohio, assignor to
Owens-Illinois, Inc.
Continuation of abandoned application Ser. No. 648,063,
June 22, 1967. This application Nov. 6, 1970, Ser.
No. 87,596
Int. Cl. C03b 5/04
U.S. Cl. 65—27                              5 Claims

ABSTRACT OF THE DISCLOSURE

Introduction of solid particulate compounds into a molten base glass by utilizing a forehearth addition section and automatic feeding equipment; the addition section including front and rear refractory blocks defining an isolated zone into which the compounds are discharged and thereby providing a more efficient, non-contaminating hygienically acceptable system.

CROSS-REFERENCES

This application is a continuation application of application Ser. No. 648,063, filed June 22, 1967, now abandoned.

BACKGROUND OF INVENTION

The present invention generally relates to the continuous manufacture of colored vitreous materials, wherein a molten base glass flows from a melting and refining furnace through a forehearth, into which suitable solid particulate colorants are added to the base glass, and thence to the forming equipment or other points of use. More particularly, the invention relates to the forehearth section in which the appropriate colorants are added to the molten base glass.

In the manufacture of glass articles, it is old in the art to alter the composition of a molten base glass by adding solid particulate compounds to a stream of this base glass as it flows through a forehearth and proceeds to the forming station or other point of use. Typically, a colorant-enriched glass frit or compounds of certain metals, cobalt oxide for example, are added in the forehearth, the purpose of which is to alter the inherent color of the base glass composition. This invention is of particular utility in those systems wherein solid particulate oxides such as, for example, cobalt oxide, nickel oxide, copper oxide, arsenic oxide, antimony oxide, lead oxide, manganese oxide, cerium oxide and molybdenum oxide are added to a molten base glass while it is flowing through the forehearth section.

Heretofore, the addition of particulate materials to the forehearth has been accomplished by simply dispensing these materials from hoppers, through open forehearth sections, into the zone adjacent the upper surface of the traversing base glass; as a result of gravity, the particles soon contact the glass surface and, by means of stirrers, are then admixed into the base glass composition. While working relatively well with large size particles, for example colorant-enriched glass frit typically having particle size distributions in the lower sieve ranges, the prior art addition techniques have not been suited for utilization with additive materials having particle sizes in the micron and higher sieve ranges. This limitation is particularly acute in the case of high glass production rates wherein metallic oxides are used to provide a desired glass coloration.

To be compatible with high production rates, the forehearth additive must be capable of rapidly dissolving within the base glass composition. Relative to colorant frit compositions, colorant oxides are particularly suitable for this purpose as they are inherently of a smaller particle size and, because of their higher coloration intensity, require substantially less material to be added per unit weight of molten base glass. However, when adding colorant oxides to the forehearth according to prior art techniques, wherein the addition takes place in a zone open to the adjacent combustion process, dusting and volatilization losses are sustained which have a significant detrimental influence upon the overall efficiency of the system. This dusting, resulting from the pneumatic conveyance of the smaller particles by the turbulent vapors of the adjacent combustion process, has in addition to the efficiency decrease, other adverse characteristics. First of all, it provides an opportunity for contaminating the virgin glass supply existing in the furnace refiner. This is of particular import, wherein a plurality of forehearths extend outwardly from a single refiner and distinct colorants are separately added to the several forehearths, as inadvertent colorant transfer to another forehearth, and/or intermixing of colorants, produces objectionable and highly undesirable results. Secondly, because of the small size of the conveyed particle, a hygienically unacceptable working environment is created by an atmosphere of dust laden air.

SUMMARY OF INVENTION

In accordance with this invention, there is provided an improvement in the techniques for adding solid particulate materials into the forehearth section of a continuous glass manufacturing system, whereby the efficiency of the addition is greatly increased, dusting is prevented or controlled and the possible contamination of glass in the refiner or other forehearths is virtually eliminated.

More particularly, there is provided a solid particulate addition section, formed in the superstructure of a forehearth, having front and back refractory blocks sealed at their upper margins defining an isolated zone over the molten glass into which the additives are discharged, the section also being provided with suitable particulate feeding means.

BRIEF DESCRIPTION OF THE DRAWINGS

The foregoing, and other advantageous features of this invention will become apparent upon reference to the drawings, of which:

FIG. 1 is a longitudinal sectional view of a forehearth showing an embodiment of this invention;

FIG. 2 is a partial longitudinal section of a forehearth showing an alternate embodiment of this invention;

FIG. 3 is a transverse sectional view taken along the plane 3—3 of FIG. 2.

DESCRIPTION OF PREFERRED EMBODIMENT(S)

Referring to the drawings, there is schematically shown a glass furnace 10 and a gas-fired forehearth 12 communicating with furnace 10. The base glass is melted and refined in the furnace tank 14 and the molten glass 16 flows through the furnace outlet 18 into a forehearth channel 20. At its forward end, forehearth 12 is provided with an outlet 22, or other means for the discharge of the glass, which may be under the control of plunger 24, for delivery at the point of use. The plunger may be operated to control the volume of glass passing through outlet 22 either by adjustment with respect to the outlet, or by reciprocation thereover to discharge gobs of glass therethrough.

Disposed intermediate the forehearth forward end and the communicating juncture of furnace 10 and forehearth 12 is a stirring section 28 and a particulate addition section 26, both being supported by the forehearth superstructure with the latter positioned upstream of the former. Stirring section 28 essentially comprises a partially submerged baffle member 30, extending transversely of the forehearth channel 20, and being situated adjacently upstream of a rotary stirrer, or a plurality of stirrers 32.

The molten base glass composition, and hence its physical and chemical properties, may be modified by dispensing suitable particulate materials to the flowing glass stream as it traverses the forehearth and proceeds toward the glass discharge means. This is accomplished by means of an addition section 26 disposed intermediate stirring section 28 and furnace outlet 18; section 26 being so constructed as to define an internal particulate discharge zone 34 virtually isolated from the vapors and turbulent convection currents of the adjacent furnace and forehearth combustion processes. While generally applicable to any type of forehearth addition, the addition section of this invention is particularly useful in those systems wherein the particulate additive materials are either highly susceptible to redox reactions, for example by substantial exposure to combustion vapors, or have a relatively small particle size and are, consequently, of a high dusting nature. As mentioned supra, the forehearth addition of colorant metallic oxides such as, for example, the oxides of cobalt, nickel, copper, arsenic, antimony, lead, manganese, cerium and molybdenum has not heretofore been entirely acceptable because of its poor efficiency, contamination of the virgin refiner glass and the unhealthy environment of dust-laden air; these deficiencies are substantially remedied by providing an isolated zone into which the colorants are discharged.

In FIG. 1, there is shown a top fed addition section 26 integrally formed with the superstructure of forehearth 12. The section includes a crown member 36 and integral, downwardly-extending partially submerged front and rear skimmer blocks 38 and 40 respectively, being longitudinally spaced and transversely coextensive with forehearth channel 20. These spaced skimmer blocks, along with the crown and addition section side walls (not shown in FIG. 1), define an internal zone 34 effectively isolated from the adjacent environment of the forehearth and furnace. Crown member 36 is provided with a port 42 so adapted as to allow an enclosed, solid particulate feeding duct 44 to be snugly inserted therethrough and allowing same to extend into the isolated zone 34. Feed duct 44, whose upper margin communicates with a particulate supply source, for example hopper 46, may be a conventional volumetric displacement screw conveyor; however, the preferred feeding duct is a vibrating screw, well known in the materials handling art.

It is important that the juncture of the skimmer blocks, and the addition section side walls, with crown 36, as well as any interface existing between port 42 and duct 44, be effectively sealed, for example by the use of mortar, so as to retain any particles tending to dust within zone 34. Thus, it will be seen that as particulate materials, for example colorant oxides, are discharged into isolated zone 34 dusting will first of all be substantially minimized because of the lack of any combustion process therein. Furthermore, as a result of the back skimmer block being submerged within the glass surface, and the sealing of the upper crown portion, any dusting which does occur will be incapable of producing the adversities of the prior art, that is the particles will be restrained in zone 34; thus, there will be no substantial losses nor contamination of the virgin glass in the refiner, or glass flowing into and through adjacent forehearths.

FIGS. 2 and 3 show an alternate embodiment wherein the addition section 26 is adapted for side feeding of the particulate materials thereto. Like the embodiment described supra, the side fed section includes a crown 36 having front and rear skimmer blocks 38 and 40 respectively, and side walls 48 disposed intermediate crown 36 and channel 20. Similarly, it is important that the junctures of the crown, skimmer blocks and side walls also be suitably sealed so as to define a virtually dust-tight internal zone 34 for particulate addition.

Side wall 48 is provided with a port 42 adapted to snugly receive a horizontally-disposed, enclosed vibrating screw conveyor 44, the latter being driven by suitable power transmitting means, for example a pulley and belt 60. The outer margin of conveyor 44 is rigidly affixed to a retractable solid particulate supply mechanism 50 which comprises an upper storage hopper 52, communicating with the conveyor inlet, and a base 54 providing structural support for hopper 52 and conveyor 44. At the lower end of base 54 are a plurality of rollers 56 mating with a complementing track 58, whereby the conveyor and supply mechanism may be easily retracted from zone 34 as an integral unit. This ease of retraction thereby provides flexibility in the system as it allows the particulate material feeding and supply means to be quickly and efficiently removed from the forehearth, thereby allowing the glass manufacturing process to operate, when desired, without the forehearth addition technique and without fear of contaminating the forehearth glass by particulate materials falling therein from a priorly used supply hopper.

Unlike the embodiment illustrated in FIG. 1, the front skimmer block 38 of FIGS. 2 and 3 is not submerged but is positioned with its lower margin closely adjacent the upper glass surface. This embodiment has been found to maintain the same dusting control as that priorly noted. That is, as the solid particulate materials are discharged by conveyor 44 into internal zone 34, dusting is substantially minimized because of the isolation of this zone from turbulent combustion vapors. Furthermore, the dusting which does result is controlled because of the sealed nature of the addition section and is restrained from entering the refiner glass by the submerged back skimmer block 40.

While preferred embodiments of this invention have been described in detail above, these embodiments are merely exemplary and not limiting. Accordingly, the true scope of this invention is to be determined by reference to the following claims.

What is claimed is:

1. In an apparatus for continuously producing a molten homogeneous colored glass product comprising furnace means for melting and refining a base glass, a forehearth extending from said furnace means having a channel delivering molten glass to integrally formed glass discharge means and including means for dispensing solid particulate colorants to the upper surface of said molten glass in said forehearth prior to its delivery to said discharge means, the improvement wherein said means for dispensing said colorants consists of a sealed forehearth addition section having a crown member, front and rear skimmer blocks extending downwardly from said crown member and being transversely coextensive with said forehearth channel, said rear skimmer block being partially submerged in the molten glass and said front skimmer block having its lower margin closely adjacent the glass surface so as to be virtually submerged in said molten glass, side walls disposed intermediate said front and rear skimmer blocks and extending downwardly from said crown member, the respective junctures of said crown member, skimmer blocks and side walls being suitably sealed so as to define a substantially dust-tight, internal particulate discharge zone virtually isolated from the adjacent forehearth-furnace environment, and retractable, snugly received duct means extending into said zone for supplying and discharging solid particulate colorants thereto at a point above the upper surface of said molten glass and thereby prevent particulate colorants from contaminating the base glass in said furnace means.

2. In an apparatus for continuously modifying the composition of a molten base glass, said apparatus including a glass melting and refining furnace, a forehearth extending from said furnace having a channel through which molten glass flows from said furnace to a glass discharge outlet and including means for dispensing solid particulate materials to the upper surface of said molten glass flowing through said forehearth channel, and stirring means downstream of said dispensing means for admixing said particulate materials and said molten base glass, the improvement consisting of a sealed substantially dust tight chamber overlying the molten glass flowing in the forehearth channel and defining an internal zone isolated from the adjacent forehearth environment, said chamber including front and rear skimmer blocks transversely coextensive with said channel having their lower margins virtually disposed beneath the surface of said flowing molten glass, and wherein said means for dispensing solid particulate materials to the upper surface of said molten glass comprises enclosed snugly received duct means extending into said chamber and terminating above the upper surface of said molten glass for supplying said particulate materials to said isolated internal zone thereby preventing contamination of said furnace means when said particles are discharged into said zone.

3. In a method for altering the composition of a molten base glass as it flows through a forehearth channel by discharging a solid particulate material onto the upper surface of said molten glass flowing in the forehearth channel, the improvement comprising: discharging said solid particulate material into an internal zone which is isolated from combustion gases and which communicates with the upper surface of said flowing molten glass so that said material is added directly onto said flowing molten glass and dusting is confined within said zone.

4. In combination with forehearth channel means carrying a flowing stream of molten glass from a glass melting and refining furnace to a discharge orifice, an apertured particulate addition section forming an upper part of said channel means, said addition section consisting of front and rear skimmer blocks partially submerged in said molten glass and being transversely coextensive with said forehearth channel means, side walls disposed intermediate said skimmer blocks and a crown member supported by said side walls and skimmer blocks, said skimmer blocks, side walls and crown being sealed, thereby defining an isolated, internal zone communicating with the upper surface of said flowing molten glass, and enclosed duct means snugly fitted in said aperture of said addition section and terminating in said isolated zone above the level of said flowing stream of molten glass for discharging solid, particulate materials into said internal zone.

5. In a method for altering the composition of a molten base glass as it flows through a forehearth channel by discharging a solid, particulate material onto the surface of said molten glass flowing in the forehearth channel, the improvement comprising: discharging a solid, particulate colorant metal oxide material into a zone which is isolated from combustion gases and overlies a preselected portion of the upper surface of the flowing molten base glass so that the particulate colorant metal oxide material is added to the flowing base glass in a dust-controlled manner.

References Cited
UNITED STATES PATENTS

| | | | |
|---|---|---|---|
| 3,321,288 | 5/1967 | Griem, Jr. | 65—161 |
| 3,330,638 | 7/1967 | Brown | 65—134 |

ARTHUR D. KELLOGG, Primary Examiner

U.S. Cl. X.R.

65—146, 335, 346